(12) United States Patent
Schulze et al.

(10) Patent No.: US 6,837,629 B1
(45) Date of Patent: Jan. 4, 2005

(54) DISPOSABLE CAMERA MOUNTING BRACKET

(76) Inventors: Clayton E. Schulze, 8282 McKee Rd., Albion, PA (US) 16401; Richard A. McGee, 7726 Lakewood Dr., Fairview, PA (US) 16415

( * ) Notice: Subject to any disclaimer, the term of this patent is extended or adjusted under 35 U.S.C. 154(b) by 0 days.

(21) Appl. No.: 10/643,497

(22) Filed: Aug. 19, 2003

(51) Int. Cl.⁷ .............................................. G03B 17/02
(52) U.S. Cl. ....................................... 396/427; 396/504
(58) Field of Search ........................... 396/6, 427, 502, 396/504

(56) References Cited

U.S. PATENT DOCUMENTS 4,433,903 A * 2/1984 Afdasta ........................ 396/59
5,128,548 A * 7/1992 Goodson et al. .......... 250/341.1
5,611,324 A * 3/1997 Kursinsky .................... 124/86
6,449,431 B1 * 9/2002 Cuddeback et al. .......... 396/27

* cited by examiner

Primary Examiner—David M. Gray
(74) Attorney, Agent, or Firm—Richard K. Thomson

(57) ABSTRACT

A mounting bracket includes an enclosure which is formed of a single piece of durable plastic formed with three living hinges allowing the generally flat piece of plastic to be folded into an enclosure. Fingers which extend from the lower edge of the front panel engage in openings in the lower panel to retain the bracket in an assembled position forming the desired enclosure. A trigger actuating arm is pivotally mounted to a bushing within the enclosure and permits a photograph to be taken when a critter engages a trip wire.

7 Claims, 3 Drawing Sheets

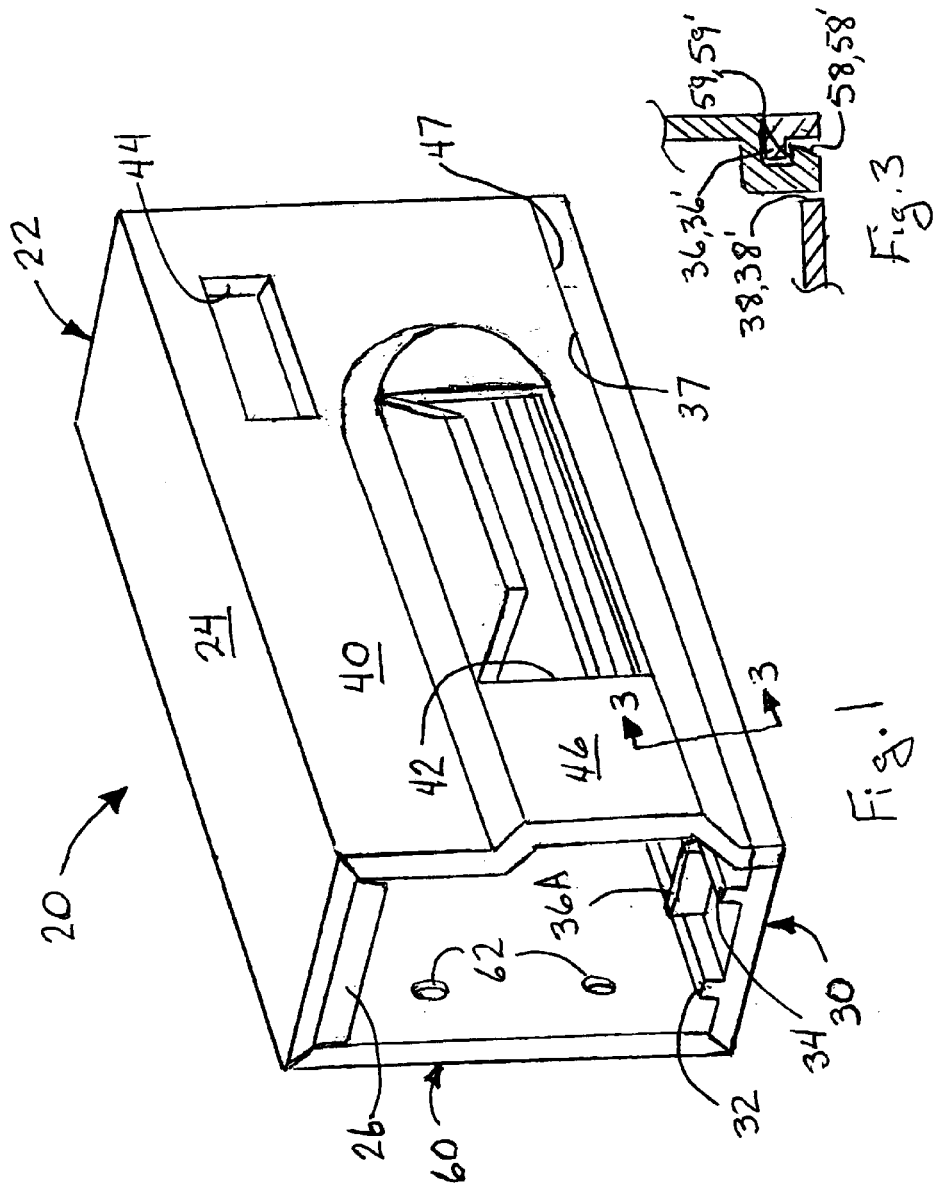

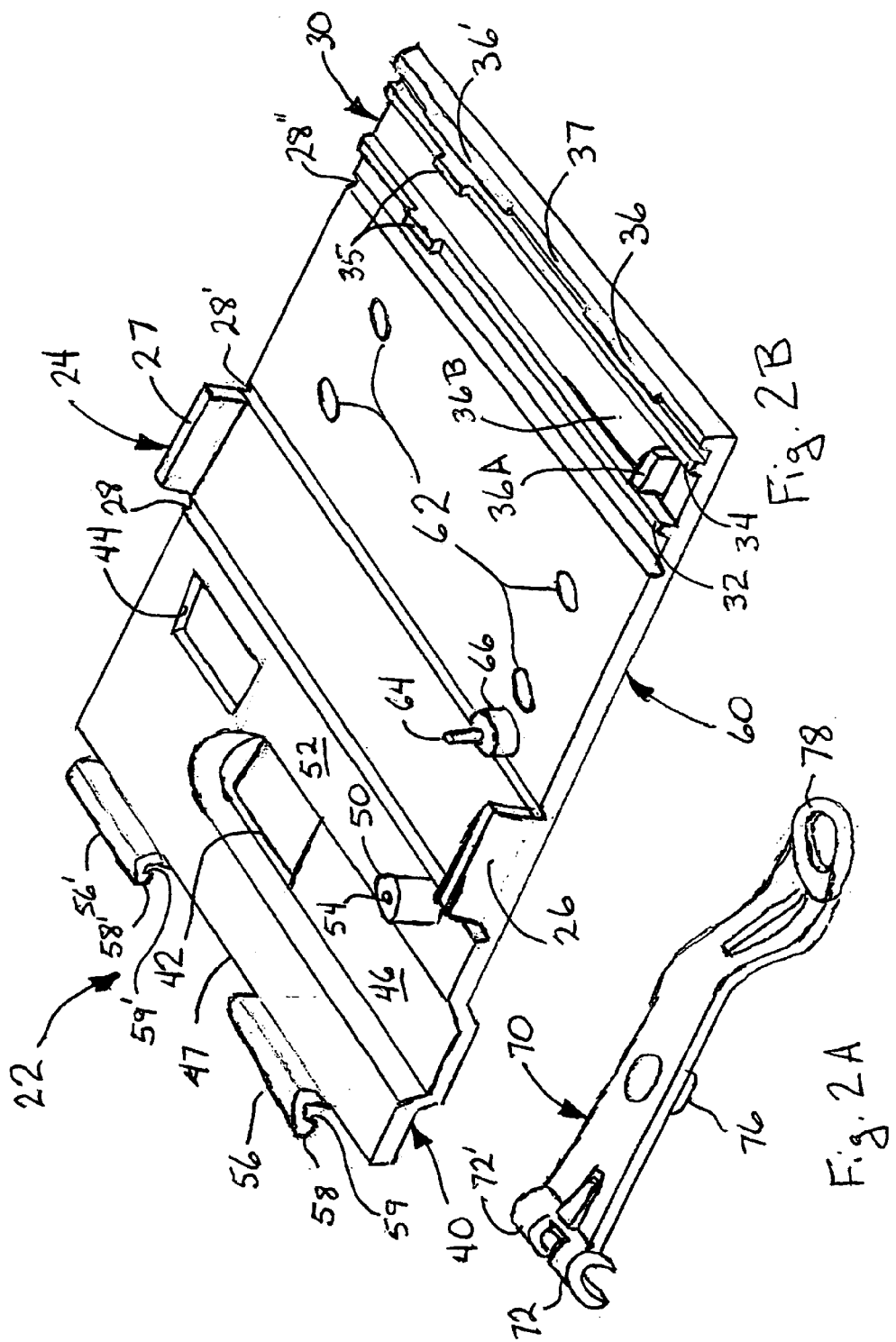

DISPOSABLE CAMERA MOUNTING BRACKET

BACKGROUND AND SUMMARY OF THE INVENTION

The present invention is directed to a camera bracket. More particularly, the present invention is directed to a mounting bracket for a disposable camera to permit photographing of wildlife, and the like, by use of a trip wire.

Obtaining a photograph of a critter by actuation of a trip wire can be beneficial in several circumstances. Among them is obtaining a snapshot of a game animal known to traverse a particular trail. Another might be getting a picture of a four legged creature disturbing a person's garden so as to determine how best to deter the pesky varmint. Yet another, could be catching a two-legged intruder on film to present evidence to the law enforcement authorities to facilitate capture and conviction.

Whatever the particular need for photographing a critter, these situations avail themselves well to the disposable cameras currently available. However, there is not a suitable, inexpensive mounting bracket which will enable these photos to be taken. It is the object of the present invention to fill that need.

The present invention comprises a mounting bracket for a disposable camera to enable a photograph to be taken of a critter such as a game animal, or the like, where the bracket includes: an open-ended enclosure which has a top, a bottom, a front and a back panel for surrounding the disposable camera, the front panel having openings accommodating a camera lens and a flash; means for mounting the bracket to a tree, post, or other object; a trigger actuator pivotally mounted to said enclosure, the trigger actuator having a button which engages a trigger switch on the camera; means on the trigger actuator for engagement by a trip wire; whereby the bracket may be secured to a tree by the means for mounting, the trip wire secured to the means for engagement and stretched across a path likely to be traveled by the critter, and the disposable camera inserted into said mounting bracket where the button on the trigger actuator is positioned above the trigger switch of the camera.

The preferred embodiment of the mounting bracket of present invention includes an awning means positioned on the front panel above the opening accommodating the camera lens to shield the lens from precipitation and direct sunlight. Further, it is preferred that the mounting bracket be comprised of a single piece of plastic having three living hinges and means permitting the enclosure to be snapped together and retained in its operative position. The mounting bracket enclosure includes a bushing and the trigger actuator has a pair of arms which engage over the bushing enabling it to pivot thereabout.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which FIG. 1 is a front perspective view of a first embodiment of the mounting bracket of the present invention;

FIG. 2A is a top perspective view of the trigger actuator of the first embodiment;

FIG. 2B is a top perspective view of the bracket enclosure shown in its as molded condition;

FIG. 3 is a cross-sectional side view of the bracket enclosure as seen along lines 3—3 of FIG. 1.

DETAILED DESCRIPTION OF PREFERRED EMBODIMENT(S)

Figure 4:
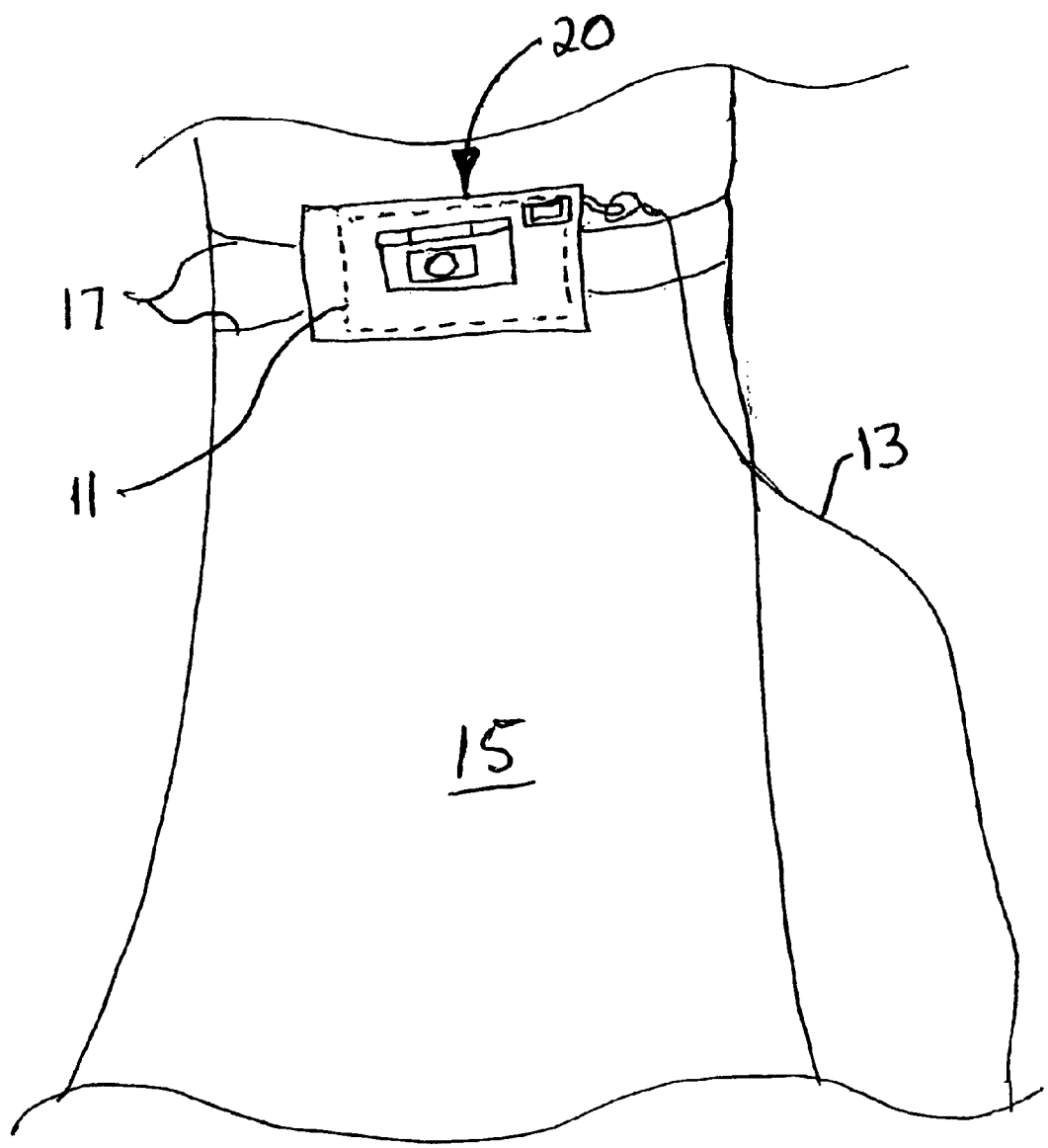
FIG. 4 is a schematic depiction showing the first embodiment in use.

A first embodiment of the mounting bracket of the present invention is shown in FIG. 1 generally at 20. Mounting bracket 20 comprises an open-ended enclosure 22 made of a durable plastic and having a top panel 24, a bottom panel 30, a front panel 40 and a back panel 60. Top panel 22 has a first downwardly extending flange 26 and a second downwardly extending flange 27 (FIG. 2B). These flanges 26, 27 provide some protection against the elements. Bottom panel 30 has a first laterally extending rib 32 and a second laterally extending rib 34 upon which the bottom of a disposable camera 11 (FIG. 4) sits. Each rib, 32, 34 has a stop detent 35 which limits movement of the camera when it is inserted from the left hand end (as seen in FIG. 1) to position the lens behind opening 42 formed in front panel 40 while positioning a flash (if any) behind opening 44. Spring detent 36A formed on spring arm 36B deflects downwardly to permit camera 11 to pass during insertion and back upwardly beside the camera to retain it within the enclosure. A pair of extending flanges 36, 36' extend rearwardly from front edge 37 overlying openings 38, 38' respectively, (FIG. 3). A first living hinge 28, connects front panel 40 to top panel 24, while a second living hinge 28' connects top panel 24 to back panel 60, and third living hinge 28" connects back panel 60 to bottom panel 30.

Front panel 40 has a protruding portion 46 which accommodates a forward extending lens of disposable camera 11. An awning 48 extends outwardly above opening 42 and protects the camera's lens from precipitation and direct sunlight, which could cause the lens to close too rapidly, adversely affecting the picture. A first bushing 50 is mounted on the inner surface 52 of front panel 40 and serves as a rotational pivot for trigger actuator arm 70 (FIG. 2B). Bushing 50 has an aperture 54 that receives guide pin 64 which extends upwardly from second bushing 66 to properly align the front panel 40 and the rear panel 60. Two latching fingers 56, 56' are shown extending outwardly from lower edge 57 of front panel 40. While two have been shown, it will be appreciated that the number of latching fingers can be two or more, without departing from the spirit of the invention.

Each finger 56, 56' has a tapered leading surface 58, 58' and an upwardly directed catch surface 59, 59' respectively, that engage under extending flanges 36, 36' to retaining the mounting bracket 20 together. Tapered leading surfaces 58, 58' facilitate snapping the fingers 56, 56' beneath flanges 36, 36'. Lower edge 47 of front panel 40 engages front edge 37 of bottom panel 30 to complete the enclosure.

Back panel 60 has a plurality of openings (shown in the figures as four in number) which permit the mounting bracket 20 to be attached to a tree 15 using cord (or wire) 17. Trigger actuator arm 70 has two claws 72, 72' which engage first and second bushings 50, 66, respectively, to permit pivoting of arm 70. Trigger actuator arm 70 has an actuator button 76 which is positioned over the trigger switch of disposable camera 11. Trigger actuator arm 70 is provided with an aperture 78 that serves as means to attach trip wire 13. It will be appreciated that the means to attach can take any number of alternate forms.

It will be understood that to assemble the mounting bracket 20 to form a camera-receiving enclosure, the three living hinges 28, 28', 28" are folded making sure that guide pin 64 enters aperture 54. Then, fingers 56, 56' are snapped into openings 38, 38' so that upwardly directed surfaces 59, 59' are engaged under flanges 36, 36'. Claws 72, 72' or trigger actuator arm 70 are then snapped in place over bushings 50, 66, with means for attaching 78 extending out the right side of the open-ended enclosure. Once cord 17 is used to attach the camera mounting bracket 20 to tree 17, or other object, using holes 62, camera 11 can be inserted into the left end of the enclosure formed by bracket 20. By pushing the camera 11 over spring detent 36A until it engages stop detents 35, the lens 19 will peer through opening 32, flash will be positioned behind opening 44 and button 76 will be positioned above the trigger switch on camera 11. Trip wire 13 can then be attached to means for attaching 78 and stretched across the path of the critter whose picture is to be taken.

Various changes, alternatives and modifications will become apparent to one of ordinary skill in the art following a reading of the foregoing specification. It is intended that any such changes, alternatives and modifications as fall within the scope of the appended claims be considered part of the present invention.

We claim:

1. A mounting bracket for a disposable camera to enable a photograph to be taken of a critter such as a game animal, and the like, said bracket comprising
   a) an open-ended enclosure which has a top, a bottom, a front and a back panel for surrounding the disposable camera, said front panel having openings accommodating a camera lens and a flash;
   b) means for mounting said bracket to a tree;
   c) a trigger actuator pivotally mounted to said enclosure, said trigger actuator having a button which engages a trigger switch on the camera;
   d) means on said trigger actuator for engagement by a trip wire;

whereby said bracket may be secured to a tree by said means for mounting, the trip wire secured to said means for engagement and stretched across a path likely to be traveled by the critter, and the disposable camera inserted into said mounting bracket where said button on said trigger actuator is positioned above the trigger switch of the camera.

2. The mounting bracket of claim 1 further comprising awning means positioned on said front panel above said opening accommodating the camera lens to shield the lens from precipitation.

3. The mounting bracket of claim 1 wherein said open end enclosure comprises a single piece of plastic having three living hinges and means permitting said enclosure to be snapped together and retained in its operative position.

4. The mounting bracket of claim 1 wherein said enclosure includes a bushing and said trigger actuator has a pair of fingers which engage over said bushing.

5. The mounting bracket of claim 1 further comprising first and second ribs positioned in said bottom panel, each said first and second rib having a stop detent for limiting lateral movement of the disposable camera into said open-ended enclosure.

6. The mounting bracket of claim 5 further comprising a spring detent which deflects downwardly as the camera is inserted into said open-ended enclosure and springs back upwardly to retain said camera in said open-ended enclosure.

7. A mounting bracket for a disposable camera to enable a photograph to be taken of a critter such as a game animal, and the like, said bracket comprising
   a) a one-piece, open-ended enclosure having a top, a bottom, a front and a back panel interconnected by living hinges and a snap-together mechanism for maintaining said enclosure in its operative position, said enclosure supporting the disposable camera;
   b) a pivot bushing mounted inside said enclosure;
   c) a trigger actuator arm pivotally mounted to said pivot bushing in said enclosure, said trigger actuator arm having a button which engages a trigger switch on the camera and means on said trigger actuator arm for connection to a trip wire;

whereby said bracket may be secured to a tree, the trip wire secured to said means on said arm for connection and stretched across a path likely to be traveled by the critter, and the disposable camera inserted into said mounting bracket where said button on said trigger actuator is positioned above the trigger switch of the camera.

* * * * *